United States Patent
Gong

(10) Patent No.: US 8,885,627 B2
(45) Date of Patent: *Nov. 11, 2014

(54) DEVICE, SYSTEM AND METHOD OF SCANNING A WIRELESS COMMUNICATION FREQUENCY BAND

(71) Applicant: Intel Corporation, Santa Clara, CA (US)

(72) Inventor: Michelle Xiaohong Gong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/732,385

(22) Filed: Jan. 1, 2013

(65) Prior Publication Data

US 2013/0142187 A1 Jun. 6, 2013

Related U.S. Application Data

(63) Continuation of application No. 12/538,920, filed on Aug. 11, 2009, now Pat. No. 8,363,630.

(51) Int. Cl.
*H04W 4/00* (2009.01)
*H04W 48/16* (2009.01)

(52) U.S. Cl.
CPC ................................ *H04W 48/16* (2013.01)
USPC .......................................... 370/338; 455/434

(58) Field of Classification Search
None
See application file for complete search history.

(56) References Cited

U.S. PATENT DOCUMENTS

| | | | |
|---|---|---|---|
| 6,484,029 B2 | 11/2002 | Hughes et al. | |
| 7,907,582 B2 | 3/2011 | Du et al. | |
| 8,363,630 B2 | 1/2013 | Gong | |
| 2004/0137926 A1 | 7/2004 | So | |
| 2006/0025136 A1 | 2/2006 | Fujita et al. | |
| 2007/0281634 A1 | 12/2007 | Rao et al. | |
| 2009/0029710 A1 | 1/2009 | Ochiai et al. | |
| 2010/0261435 A1 | 10/2010 | Behzad et al. | |
| 2011/0038357 A1 | 2/2011 | Gong | |

FOREIGN PATENT DOCUMENTS

| | | |
|---|---|---|
| CN | 1939006 | 3/2007 |
| JP | 2004229278 | 8/2004 |
| JP | 2008187544 | 8/2008 |
| WO | 2009016800 | 2/2009 |

OTHER PUBLICATIONS

Office Action for Chinese Patent Application No. 201010260612.6, mailed on Mar. 11, 2013, 14 pages., including 8 pages of English translation.

(Continued)

*Primary Examiner* — Afshawn Towfighi
(74) *Attorney, Agent, or Firm* — Shichrur & Co.

(57) ABSTRACT

Device, system, and method of scanning a wireless communication frequency band. Some embodiments may include scanning a set of channels of a wireless communication frequency band to detect a wireless area network, the scanning including setting a scanning duration to a duration of a beacon interval, scanning a channel of the set of channels for the scanning duration, if a packet is detected over the channel, monitoring the channel for up to a predefined time period, which is longer than the scanning duration, to receive a beacon frame; if no beacon frame is received over the channel, scanning another channel of the set of channels for the scanning duration; and if, after scanning all channels of the set of channels, no beacon frame is received, increasing the scanning duration and repeating the scanning using the increased scanning duration. Other embodiments are described and claimed.

7 Claims, 3 Drawing Sheets

(56) References Cited

OTHER PUBLICATIONS

Office Action for Japanese Patent Application No. 2012-523631, mailed on Feb. 12, 2013, 5 pages, including 2 pages of English translation.
International Search Report and Written Opinion for PCT Patent Application No. PCT/US2010/042450, mailed on Feb. 28, 2011, 6 pages.
International Preliminary Report on Patentability for PCT Patent Application No. PCT/US2010/042450, mailed on Feb. 23, 2012, 5 pages.
Office Action for U.S. Appl. No. 12/538,920, mailed on Jan. 19, 2012, 26 pages.
Final Office Action for U.S. Appl. No. 12/538,920, mailed on Jul. 5, 2012, 25 pages.
IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.
Office Action for Chinese Patent Application No. 201010260612.6, mailed on Nov. 19, 2013, 10 pages, including 6 pages of English translation.
Office Action for Chinese Patent Application No. 201010260612.6, mailed Jun. 12, 2014, 9 pages, including 6 pages of English translation.

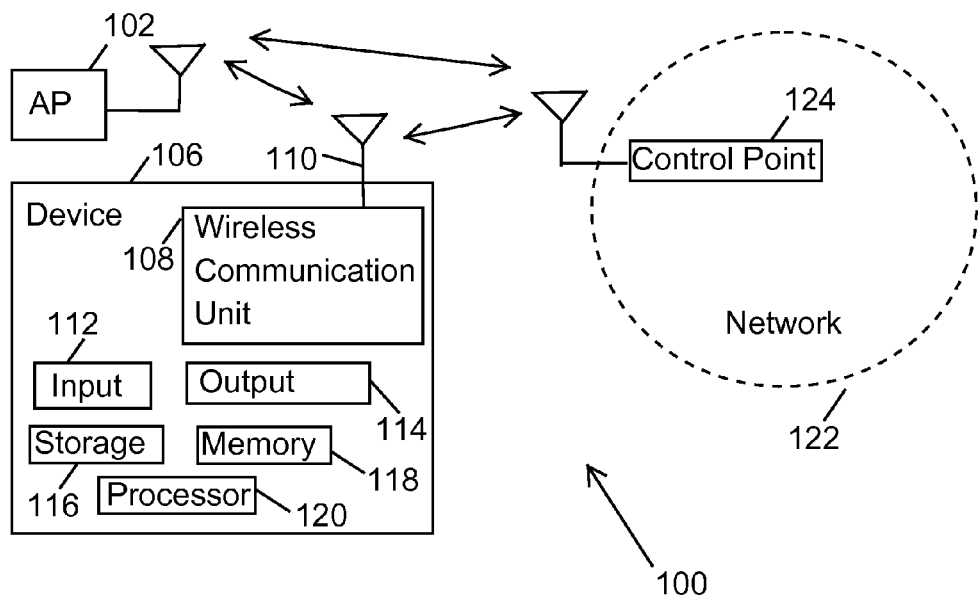
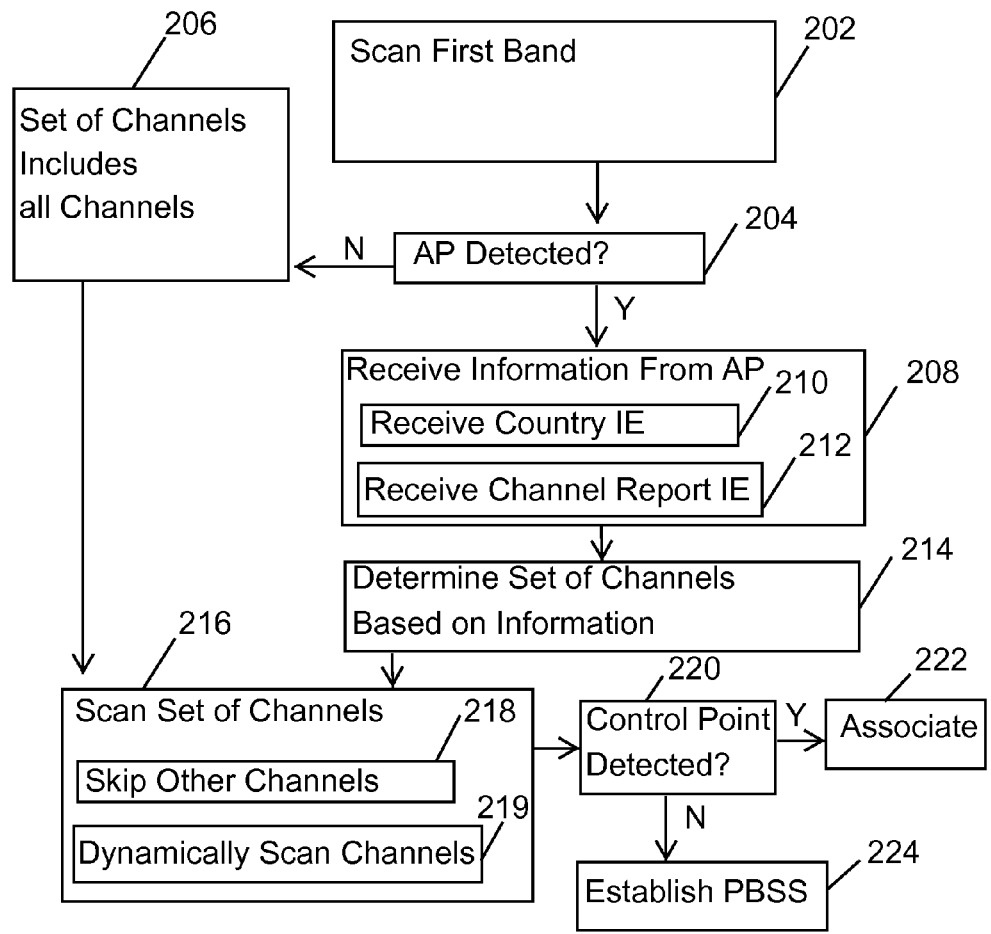
Fig. 1
Fig. 2

ID

DEVICE, SYSTEM AND METHOD OF SCANNING A WIRELESS COMMUNICATION FREQUENCY BAND

CROSS REFERENCE

This Application is a Continuation Application of U.S. patent application Ser. No. 12/538,920 entitled "Device, System and Method of Scanning a Wireless Communication Frequency Band", filed Aug. 11, 2009, the entire disclosure of which is incorporated herein by reference.

BACKGROUND

To facilitate wireless communication over the 60 GHz frequency band, different regulatory domains define different frequency bands and/or different Effective/Equivalent Isotropic Radiated Power (EIRP) requirements. For instance, the United States Federal Communications Commission (FCC) allocates the frequency band between 57 GHz and 64 GHz for wireless communication, and allows an EIRP of up to 43 decibel to milliwatt (dBm) with an average EIRP of 40 dBm; whereas the Australian regulations allocate the frequency band between 59.4 GHz and 62.9 GHz, and allow an EIRP of up to 51 dBm.

A wireless communication device may be required to utilize a suitable frequency channel and a suitable EIRP in compliance with the regulatory requirements of a regulatory domain in which the wireless communication device is located. The device may be set-up, e.g., hardcoded, to utilize a lowest common denominator of most or all regulatory domains, e.g., the channel of between 59.400 GHz and 61.560 GHz and an EIRP of 27 dBm, in order to comply with the regulator requirements of most or all regulator domains. However, such a setting may significantly limit a capacity of a wireless network over the 60 GHz frequency band.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1 is a schematic block diagram illustration of a system in accordance with some demonstrative embodiments.

FIG. 2 is a schematic flow-chart illustration of a method of scanning a wireless communication frequency band, in accordance with some demonstrative embodiments.

DETAILED DESCRIPTION

Figure 3:
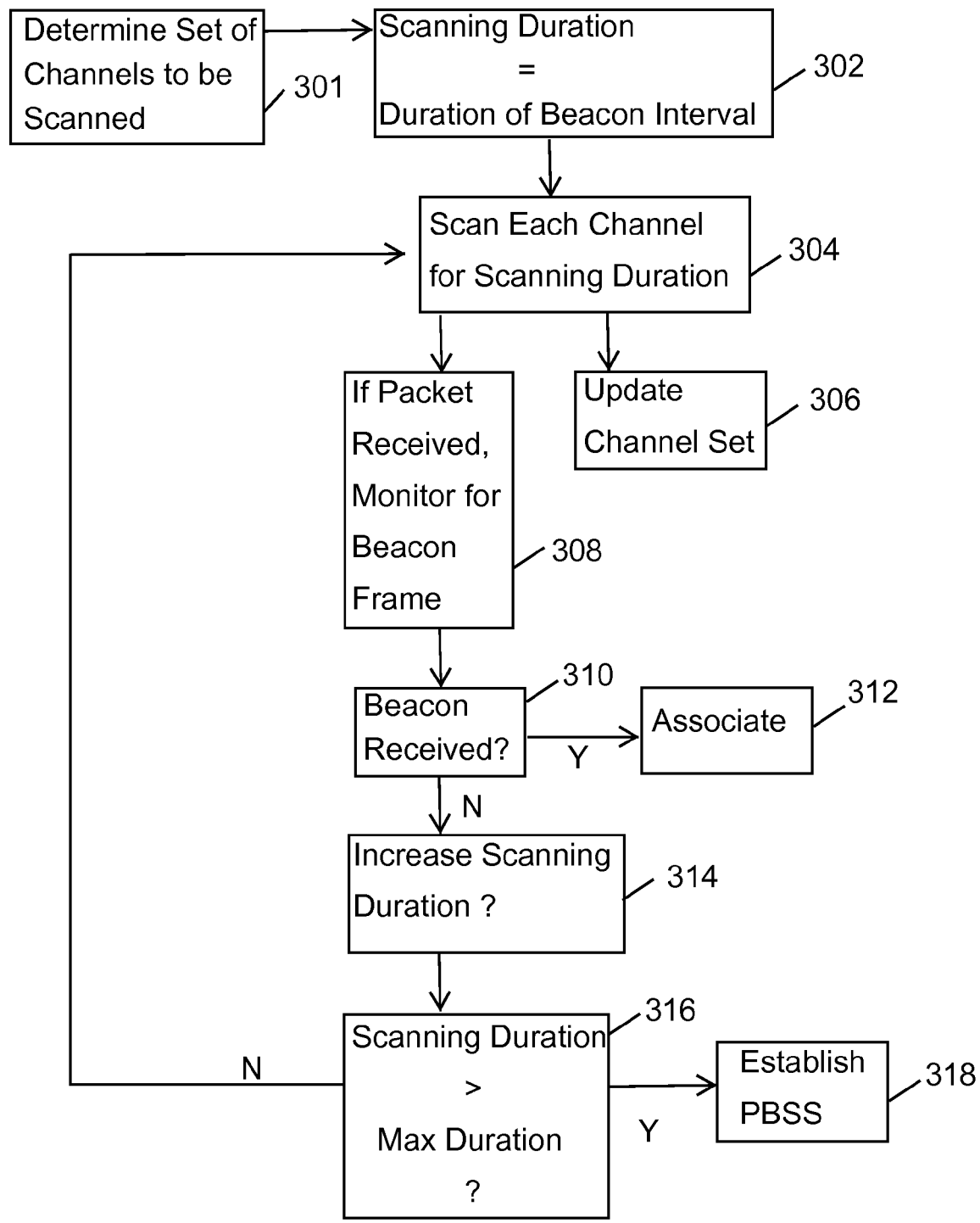
FIG. 3 is a schematic flow-chart illustration of a method of scanning one or more wireless communication frequency channels, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Are Network (WVAN), a Local Area Network (LAN), a Wireless LAN (WLAN), a Personal Area Network (PAN), a Wireless PAN (WPAN), devices and/or networks operating in accordance with existing IEEE 802.11 (*IEEE 802.11-1999: Wireless LAN Medium Access Control (MAC) and Physical Layer (PHY) Specifications*), 802.11a, 802.11b, 802.11g, 802.11h, 802.11j, 802.11n, 802.16, 802.16d, 802.16e, 802.16f, standards and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

Some demonstrative embodiments may be used in conjunction with suitable limited-range or short-range wireless communication networks, for example, a wireless area network, a "piconet", WPAN, a WVAN and the like.

Some demonstrative embodiments are described herein with reference to a frequency band of 2.4 Gigahertz (GHz) and/or 5 GHz (commonly referred to as the 2.4/5 GHz frequency band); and/or a frequency band of 60 GHz. However, other embodiments may be implemented utilizing any other suitable wireless communication frequency bands, for example, an Extremely High Frequency (EHF) band (millimeter wave (mmwave) frequency band), e.g., a frequency band within the frequency band of between 30 Ghz and 300 GHZ; a WLAN frequency band, a WPAN frequency band, a frequency band according to the IEEE 802.11 and/or WGA specifications, and the like.

Some demonstrative embodiments are described herein with reference to selectively utilizing and/or scanning one or more frequency channels of a 60 GHz frequency band based on information received over the 2.4/5 GHz frequency band. However, other embodiments may be implemented to utilize and/or scan one or more frequency channels of any suitable first frequency band based on information received over any suitable second frequency band.

Reference is now made to FIG. 1, which schematically illustrates a block diagram of a system 100 in accordance with some demonstrative embodiments.

In some demonstrative embodiments, one or more elements of system 100 may be capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

As shown in FIG. 1, in some embodiments, system 100 may include at least one wireless communication device ("station") 106, which includes a wireless communication unit 108 capable of performing wireless communication with one or more other devices of system 100, e.g., as described below.

In some demonstrative embodiments, wireless communication device 106 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments device 106 may include, for example, one or more of a processor 120, an input unit 112, an output unit 114, a memory unit 118, and a storage unit 116. Device 106 may optionally include other suitable hardware components and/or software components. In some embodiments, some or all of the components of device 106 may be enclosed in a common housing or packaging, and may be interconnected or operably associated using one or more wired or wireless links. In other embodiments, components of device 106 may be distributed among multiple or separate devices or locations.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of device 106, and/or of one or more suitable applications.

Input unit 112 includes, for example, a keyboard, a keypad, a mouse, a touch-pad, a track-ball, a stylus, a microphone, or other suitable pointing device or input device. Output unit 114 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a CD-ROM drive, a DVD drive, or other suitable removable or non-removable storage units. Memory unit 118 and/or storage unit 116, for example, store data processed by device 106.

In some demonstrative embodiments, wireless communication unit 108 includes, for example, one or more wireless transmitters, receivers and/or transceivers able to send and/or receive wireless communication signals, RF signals, frames, blocks, transmission streams, packets, messages, data items, and/or data. For example, wireless communication unit 108 may include or may be implemented as part of a wireless Network Interface Card (NIC), and the like.

Wireless communication unit 108 may include, or may be associated with, one or more antennas or one or more sets of antennas 110. Antennas 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some embodiments, wireless communication unit 108 may be capable of communicating with one or more devices of at least one wireless area network 122 over the mmwave frequency band, for example, the 60 GHz frequency band. Wireless area network 122 may include, for example, a Personal-Independent-Basic-Service-Set (PBSS), a WPAN, a WVAN, a piconet, and the like. Wireless communication unit 108 may be able to join an existing PBSS and/or establish a new PBSS over the 60 GHZ frequency band.

In some embodiments, a wireless area network over the 60 GHz frequency band, e.g., network 122, may be required and/or allowed to utilize only one or more defined channels of the 60 GHz frequency band, e.g., in accordance with regulations defined by a regulatory domain, in which wireless network 122 is established and/or located. For example, the United States Federal Communications Commission (FCC) allocates the frequency band between 57 GHz and 64 GHz for wireless communication, and allows an Effective/Equivalent Isotropic Radiated Power (EIRP) of up to 43 decibel to milliwatt (dBm) with an average EIRP of 40 dBm; while the Australian regulations allocate the frequency band between 59.4 GHz and 62.9 GHz, and allow an EIRP of up to 51 dBm.

In some embodiments, the 60 Ghz frequency band may be divided into a plurality of channels, for example, into four channels, denoted channel 1, channel 2, channel 3 and channel 4, respectively, e.g., as follows:

TABLE 1

| Channel ID | Start Frequency (GHz) | Center Frequency (GHz) | Stop Frequency (GHz) |
|---|---|---|---|
| 1 | 57.240 | 58.320 | 59.400 |
| 2 | 59.400 | 60.480 | 61.560 |
| 3 | 61.560 | 62.640 | 63.720 |
| 4 | 63.720 | 64.800 | 65.880 |

In some embodiments, only channel 2, i.e., the channel between the frequencies of 59.400 GHz and 61.560 GHz, may be included in the frequency band allocated by most or all of the regulatory domains. An EIRP, e.g., of 27 dBm may be allowed by most or all of the regulatory domains. Accordingly, a default communication scheme, e.g., which may conform with most or all regulator domains, may include utilizing channel 2 with an EIRP of up to 27 dBm. However, such default communication scheme may result in limited network capacity.

In some embodiments, a wireless area network over the 60 GHz frequency band, e.g., network 122, may be formed ad-hoc or "on the fly", e.g., without any infrastructure support. For example, device 106 may include a mobile device, which may travel, together with a user of device 106, between different locations, e.g., belonging to different regulatory domains and/or countries. Accordingly, device 106 may be allowed to utilize different wireless communication frequency channels and/or EIRP settings according to different regulatory domains, in which device 106 may be located.

In some embodiments, wireless communication unit 108 may automatically and/or dynamically determine at least one suitable channel and/or EIRP to be utilized for communications over the 60 GHz band, for example, in accordance with regulatory requirements of a regulatory domain in which device 106 is located, e.g., as described below.

In some embodiments, wireless communication unit 108 may scan the 60 GHz frequency band to detect a control point 124 of wireless area network 122, e.g., in order to join wireless area network 122. Control point 124 may control communications over wireless network 122. In one embodiment, control point 124 may include a suitable PBSS Control Point (PCP) or a coordinator, e.g., as defined by the IEEE 802.11, and/or WGA specifications.

In some embodiments, scanning the entire 60 GHz frequency band, e.g., while only one or more channels of the 60 GHz band may be allowed for communication according to the regulator domain in which device 106 is located, may be inefficient, may consume a large amount of power of device 106 and/or may require a long scanning period.

In some embodiments, wireless communication unit 108 may be capable of receiving information indicating a regulatory domain at the location of device 106. Wireless communication unit 108 may determine one or more wireless communication settings to be used for communication over the 60 GHz frequency band. For example, wireless communication unit 108 may determine one or more 60 GHz frequency channels ("the allowed channels") and/or EIRP settings, which are allowed by the regulatory domain. Based on the received information, wireless communication unit 108 may scan the allowed channels to detect wireless communications, for example, while skipping one or more other frequency channels, which may not be allowed by the regulatory domain, e.g., as described below.

In some demonstrative embodiments, wireless communication unit 108 may be capable of communicating with an Access Point (AP) 102 over a wireless communication band different from the 60 GHz frequency band. In one embodiment, wireless communication unit 108 may communicate with AP 102 over the 2.4/5 Ghz frequency band, or any other suitable frequency band. For example, wireless communication unit 108 may include any suitable dual-band or multi-band wireless communication unit. In other embodiments, wireless communication unit 108 may include any other suitable wireless communication unit, e.g., a single-band communication unit capable of communicating over the communication frequency band utilized by network 122, while not being capable of communicating with AP 102.

In some demonstrative embodiments, wireless communication unit 108 may scan a first wireless communication frequency band, e.g., the 2.4/5 GHz frequency band to detect AP 102. Upon detecting AP 102, wireless communication unit 108 may communicate over the first wireless communication frequency band, to receive from AP 102 information identifying a set of one or more channels, e.g., the four frequency channels of Table 1, of a second wireless communication frequency band, e.g., the 60 Ghz frequency band. Wireless communication unit 108 may scan the set of channels to detect wireless area network communications, e.g., of control point 124, as described below.

In some embodiments, the set of channels may be identified based on information identifying a regulatory domain at the location of device 106. For example, wireless communication unit 108 may receive from AP 102 information identifying a regulatory domain, in which AP 102 is operating. For example, wireless communication device 108 may receive from AP 102 one or more frames, for example, a beacon frame and/or a probe response frame, which may include a country Information Element (IE) and/or one or more AP channel report IEs.

The country IE may include any suitable information identifying a WLAN regulatory domain in which AP 102 is located, e.g., in the form of a country string, which may include an International Organization of Standardization (ISO) country code of a country in which AP 102 is located. The country IE may include any other suitable format and/or information.

In some embodiments, wireless communication unit 108 may determine, e.g., based on the country identified by the country code of the country IE, the regulatory requirements for the 60 GHz frequency band. For example, wireless communication unit 108 may store, e.g., in the form of a table, a list of countries, e.g., identified by county code, associated with a corresponding list of 60 GHz regulatory requirements, e.g., one or more allowed frequency channels and/or allowed EIRP values. Wireless communication unit 108 may select from the list one or more allowed 60 GHz frequency channels corresponding to the country code provided by the country IE. For example, if the country IE includes the country code of the United States, then wireless communication unit 108 may determine that the allowed frequency channels include the frequency channels 1, 2, and 3; while, if the country IE includes the country code of Australia, then wireless communication unit 108 may determine that the allowed frequency channels include the frequency channel 2.

The AP channel report IEs may include suitable information related to an existing 60 GHz wireless area network, e.g., network 122. For example, AP 102 may receive from control point 124 information ("PCP information") identifying at least one 60 GHz frequency channel ("PCP channel") utilized by control point 124 for communication. AP 102 may receive the PCP information, e.g., even if AP 102 does not support communication over the 60 GHz band. For example, AP 120 may receive the PCP information from control point 124 over the 2.4/5 GHz frequency band, e.g., if control point 124 supports communication over both the 2.4/5 Ghz and 60 GHz frequency bands. AP 102 may transmit the PCP information to wireless communication unit 108 as part of the AP channel report IEs.

In some embodiments, wireless communication unit 108 may receive the AP channel report IEs from AP 102, and directly scan the identified PCP channel to detect control point 124, e.g., while skipping other channels, e.g., regardless of whether or not the other channels are allowed by the regulatory requirements of the country identified by the country IE.

In some embodiments, wireless communication unit may determine a set of one or more frequency channels to be scanned. In one example, the set may include, for example, the one or more 60 GHz channels allowed according to the regulatory domain requirements. In another example, the set may include the PCP channel, e.g., if wireless communication unit receives the PCP information from AP 102. In yet another example, the set of channels may include all channels of the 60 GHz frequency band, e.g., if wireless communication unit 108 cannot detect AP 102.

In some embodiments, wireless communication unit 108 may initiate a scanning procedure over the set of frequency channels. Wireless communication unit 108 may select a control point to associate with one or more control points detected during the scanning procedure.

In some embodiments, wireless communication unit 108 may skip scanning of other channels of the 60 GHz frequency band, which are not included in the set of frequency channels, e.g., channels not identified by the information received from AP 102.

In some embodiments, because the channels allowed in each regulatory domain are usually a subset of all 60 GHz channels, selecting the channels to be scanned based on the regulatory domain information may reduce the scanning time of wireless communication unit 108.

In some embodiments, wireless communication unit 108 may include a PCP-capable wireless communication unit, which may be capable of operating as a PCP. In some embodiments, wireless communication unit 108 may establish a new and/or independent network over the 60 GHz frequency band, for example, if wireless communication unit 108 is not able to detect any control point 124 during the scanning procedure. For example, wireless communication unit 108 may establish a new or independent PBSS in which wireless communication unit 108 may act as a PCP.

In some embodiments, wireless communication unit 108 may decide to scan other channels during the operation of the PBSS, e.g., even after communication unit 108 starts a PBSS on a particular frequency channel ("the PBSS channel"). Wireless communication unit 108 may allocate a self-addressed Service Period (SP) or doze beacon intervals, e.g., so that other stations would not transmit to wireless communication unit 108. Wireless communication unit 108 may go off the particular PBSS channel to scan for other available channels, e.g., during the self-addressed SP or doze beacon intervals. For example, wireless communication unit 108 may choose to scan for other available channel if the PBSS channel experiences interference, e.g., from other systems operating on the same channel.

Reference is made to FIG. 2, which schematically illustrates a method of determining a frequency channel for communicating over a wireless area network, in accordance with some demonstrative embodiments. In some embodiments, one or more of the operations of the method of FIG. 2 may be performed by a wireless communication unit, e.g., wireless communication unit 108 (FIG. 1).

As indicated at block 202, the method may include scanning a first wireless communication frequency band. For example, wireless communication unit 108 (FIG. 1) may scan the 2.4/5 GHz frequency band, e.g., as described above.

As indicated at block 204, the method may include determining whether or not an AP has been detected over the first wireless communication frequency band.

As indicated at block, 208, the method may include, upon detecting at least one AP communicating over the first wireless communication frequency band, receiving from the detected AP information identifying one or more frequency channels of a second wireless communication frequency band, different from the first wireless communication frequency band. For example, wireless communication unit 108 (FIG. 1) may receive from AP 102 (FIG. 1) information identifying one or more frequency channels of the 60 GHz frequency band allowed for communication by a regulatory domain in which device 106 (FIG. 1) is located, e.g., as described above.

As indicated at block 214, the method may include defining a set of channels to be scanned to include the one or more identified channels. For example, wireless communication unit 108 (FIG. 1) may include in the one or more identified 60 GHz frequency channels in the set of channels to be scanned, e.g., as described above.

As indicated at block 212, the method may include receiving a country IE identifying a regulatory domain in which the AP is located. Accordingly, determining the set of channels to be scanned may include may defining the set of channels to include one or more frequency channels of the second wireless communication frequency band in accordance with the regulatory domain requirements corresponding to the country IE. For example, wireless communication unit 108 (FIG. 1) may determine the set of channels to be scanned to include the frequency channels allowed by the regulatory domain identified by the country IE, e.g., as described above.

As indicated at block 210, receiving the information from the AP may include receiving at least one channel report IE from the AP, the channel report IE identifying a channel utilized by a control point of a wireless area network over the second wireless communication frequency band. Accordingly, the set of channels may be defined to include the channel identified by the channel report IE. For example, wireless communication unit 108 (FIG. 1) may receive the channel report IE from AP 102 and determine that the scan is to be performed over a PCP channel identified by the channel report IE, e.g., in order to detect control point 124 (FIG. 1).

As indicated at block 206, the method may include determining the set of channels to include all channels of the second wireless communication frequency band, e.g., if no AP is detected on the first wireless communication frequency band and/or if not information corresponding to the second wireless communication frequency band is received from the AP. For example, wireless communication unit 108 (FIG. 1) may determine that all four channels of the 60 GHz frequency band are to be scanned, e.g., if no AP is detected on the 2.4/5 GHz frequency band.

As indicated at block 216, the method may include scanning the set of channels to detect wireless area network communications of at least one wireless area network. For example, wireless communication unit 108 (FIG. 1) may scan the set of channels to detect communications of wireless network 122 (FIG. 1).

As indicated at block 218, the method may include skipping the scanning of other channels of the second wireless network, which are not included in the set of channels. For example, wireless communication unit 108 (FIG. 1) may skip the scanning of channels of the 60 GHz frequency band, which are not identified by the information received from AP 102 (FIG. 1), e.g., as described above.

As indicated at block 219, the method may include dynamically scanning the set of identified channels, e.g., as described below with reference to FIG. 3.

As indicated at block 220, the method may include determining whether or not at least one control point has been detected during the scanning.

As indicated at block 222, the method may include associating with a detected control point, e.g., if one or more control points have been detected during the scanning. For example, wireless communication unit 108 (FIG. 1) may select to associate to a selected control point of the one or more detected control points, e.g., control point 124 (FIG. 1), e.g., as described above.

As indicated at block 224, the method may include establishing a network over a selected channel of the set of channels, e.g., if a control point is not detected during the scanning. For example, wireless communication unit 108 (FIG. 1) may establish a new PBSS over the 60 GHz frequency band, if no control point 124 (FIG. 1) is detected, e.g., as described above.

Referring back to FIG. 1, in some embodiments, wireless communication unit 108 may not receive the regulatory information corresponding to the 60 Ghz frequency band. In one example, wireless communication unit 108 may not be able to detect AP 102. In another example, wireless communication unit 108 may not be able to communicate over the 2.4/5 GHz frequency band, e.g., if wireless communication unit includes a single-band communication unit capable of communicating over the communication frequency band utilized by network 122, while not being capable of communicating with AP 102.

In some embodiments, wireless communication unit 108 may passively scan the 60 GHz frequency band to detect control point 124. For example, wireless communication unit may passively scan all of the four channels of Table 1.

In some embodiments, a control point, e.g., control point 124, may utilize variable-sized beacon intervals and/or the control point may not transmit a beacon in every beacon interval, e.g., in order to conserve power. As a result, it may be more difficult for a wireless communication device to detect control point 124, when scanning the 60 GHz band.

In some embodiments, wireless communication unit 108 may utilize a dynamic, iterative, scanning method to scan the 60 GHz frequency band, e.g., as described below.

Reference is made to FIG. 3, which schematically illustrates a method of scanning one or more frequency channels, in accordance with some demonstrative embodiments. In some embodiments, one or more of the operations of the method of FIG. 3 may be performed by a wireless communication unit, e.g., wireless communication unit 108 (FIG. 1).

As indicated at block 301, the method may include determining a set of channels to be scanned. For example, wireless communication unit 108 (FIG. 1) may determine the set of channels to include one or more frequency channels base on information received from AP 102 (FIG. 1), for example, to include one or more channels in accordance with requirements of a regulator domain and/or a PCP channel; or to include all frequency channels of the 60 GHz frequency band, e.g., as described above.

In some embodiments the method may include performing one or more scanning iterations using different scanning durations ("intervals"), e.g., as described below.

As indicated at block 302, the method may include setting a scanning duration, denoted MinChannelTime, to a duration of a predefined beacon interval, denoted max_BI, of a wireless area network, for example, a maximal beacon interval defined for a 60 GHZ network, e.g., as defined by the WGA specification. For example, wireless communication unit 108 (FIG. 1) may set the scanning duration to a beacon interval defined for a 60 GHz network, e.g., network 122 (FIG. 1).

As indicated at block 304, the method may include scanning each channel of the set of channels for the scanning duration. For example, wireless communication unit 108 (FIG. 1) may passively scan each channel of the set of channels for any packet, e.g., any mmwave packet. In some embodiments, if the set of channels includes channel 2 of Table 1, then the scanning may begin with the scanning of channel 2, which may be supported by most or all regulatory domains, e.g., as discussed above.

As indicated at block 308, if a packet, e.g., a mmwave packet, is detected over a channel of the set of channels, the method may include monitoring the channel for up to a predefined time period, denoted MaxChannelTime, which is longer than the scanning duration, to receive a beacon frame from a control point, e.g., a PCP. For example, if wireless communication unit 108 (FIG. 1) receives a mmwave packet over a channel, then wireless communication unit may "stay" on the channel to receive a beacon from a PCP, e.g., PCP 124 (FIG. 1). Wireless communication unit 108 (FIG. 1) may monitor the channel, e.g., even if the time "spent on" the channel may exceed the scanning interval. For example, wireless communication unit 108 (FIG. 1) may monitor the channel for the beacon until the expiration of the time period MaxChannelTime. The time period MaxChannelTime may be, for example, equal to the maximal time period during which a control point, e.g., PCP 124 (FIG. 1), may be allowed not to transit a beacon. For example, the time period MaxChannelTime may be equal to the product max_BI*mMaxLostBeacons, wherein mMaxLostBeacons denotes a number of beacons that a control point may skip, e.g., as defined by the WGA specification.

As indicated at block 310, the method may include determining whether a beacon has been received over the channel.

As indicated at block 312, the method may include associating with a control point from which a beacon has been received. For example, wireless communication unit 108 (FIG. 1) may associate with control point 124 (FIG. 1), e.g., if control point 124 (FIG. 1) has a matching Service-Set-Identifier (SSID), Basic-Service-Set-Identifier (BSSID), Service Type, and the like.

As indicated at block 306, the method may include updating the set of channels to be scanned. For example, upon detecting a control point, e.g., a PCP, wireless communication unit 108 (FIG. 1) may send an Information Request frame to the control point, and receive in response regulatory domain information from the control point. Wireless communication unit 108 (FIG. 1) may update the channels set to omit or not include one or more channels, which do not correspond to the regulatory domain. Accordingly, the duration of the scanning may be reduced, e.g., since a reduced number of channels may be scanned.

As indicated at block 314, if no beacon frame is received after scanning all channels of the set of channels, the method may include increasing the scanning duration and performing another iteration to repeat the scanning using the increased scanning duration. As indicated at block 316, the scanning duration may be increased the scanning duration reaches a predefined scanning duration limit, for example, the value of MaxChannelTime. For example, if no PCP is discovered during the scanning of all channels of the set of channels, then wireless communication unit 108 (FIG. 1) may double the scanning duration and repeat the scanning, e.g., until the scanning duration reaches MaxChannelTime.

In some embodiments, increasing the scanning duration may include doubling the scanning duration. In other embodiments, the scanning duration may be increased in any other suitable manner.

As indicated at block 318, if a control point or wireless network has not been discovered after scanning all channels of the set of channels and the scanning duration has reached the scanning duration limit, then the method may include establishing a PBSS. For example, if wireless communication unit 108 (FIG. 1) does not detect any existing 60 GHz network on any channel, then wireless communication unit 108 (FIG. 1) may starts a PBSS on, e.g., on channel 2.

In some embodiments, the scanning duration may be initially set to the value of max_BI*mMaxLostBeacons. For example, wireless communication unit 108 (FIG. 1) may be can hard-code with the scanning duration of max_BI*mMaxLostBeacons. According to these embodiments, the method may include monitoring the channel, over which the packet has been detected, for the period MaxChannelTime.

In some embodiments, one or more operations of the method of FIG. 3 may be implemented using any suitable computer readable program including a computer code, for example, written in a "C" computer language or any other suitable language. For example, one or more operations of the method of FIG. 3 may be implemented using at least part of the following pseudo code:

```
Scanning_interval = MinChannelTime;
Channel_list = all four channels;
While (scanning_interval < MaxChannelTime)
{
    Scanning_interval = Scanning interval >> 1;
    Result = Scan(scanning_interval, channel_list);
    If (Result == success && stop_scanning ==1) Break;
}
Unsigned int Scan(scanning_interval, channel_list)
{
    Result = NULL;
    Stop_scanning = NULL;
    While (channel_list != { } )
    {
        If stop_scanning ==1
           Break;
        tmp_timer = scanning_interval;
        While (1)
        {
        If stop_scanning ==1 || tmp_timer expires
           Break;
         Switch (pkt_recv) {
         Case 1 : a country IE or an AP Channel Report IE is received
         {
            Update channel_list based on regulatory info
            Update country_info
            Break;
         }
         Case 2: an mmWave packet is received
         {
            If the packet is from an unknown PBSS
            {
               If (extended_scanning ==0)
               {
                  tmp_timer=MaxChannelTime;
                  extended_scanning = 1;
               }
            }
            Break;
         }
         Case 3: a PCP's beacon is received
         {
            Record the PCP info
            Result = success;
            If a matching SSID, BSSID, or Service Type is found
            {
               Stop_scanning = 1;
            }
            Break;
         }
         Case 4: tmp_timer expires
         {
            Update Channel_list
            Break;
         }
         Default:
         }
    }
    return Result;
}
```

Figure 4:
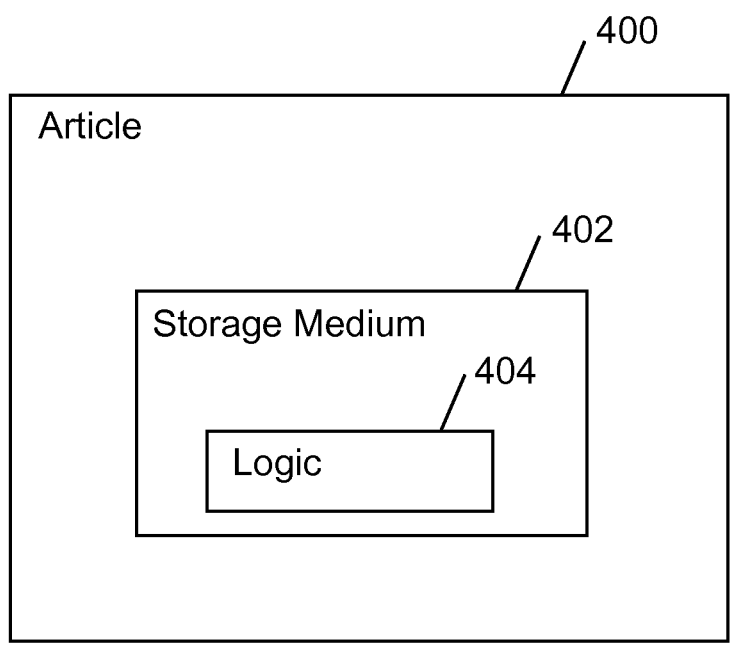
FIG. 4 is a schematic block diagram illustration of an article of manufacture, in accordance with some demonstrative embodiments.

Reference is made to FIG. 4, which schematically illustrates an article of manufacture 400, in accordance with some demonstrative embodiments. Article 400 may include a machine-readable storage medium 402 to store logic 404, which may be used, for example, to perform at least part of the functionality of wireless communication unit 108 (FIG. 1); and/or to perform one or more operations of the method of FIG. 2 and/or FIG. 3.

In some embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A product including a non-transitory storage medium having stored thereon instructions that, when executed by a machine, result in:
   scanning a set of channels of a wireless communication frequency band to detect a wireless area network, the scanning including:
      setting a scanning duration to a duration of a beacon interval;
      scanning a channel of the set of channels for the scanning duration;
      if a packet is detected over the channel, monitoring the channel for up to a predefined time period, which is longer than the scanning duration, to receive a beacon frame;
      if no beacon frame is received over the channel, scanning another channel of said set of channels for the scanning duration; and
      if, after scanning all channels of the set of channels, no beacon frame is received, increasing the scanning duration and repeating the scanning using the increased scanning duration.

2. The product of claim 1, wherein said instructions result in:
   scanning a first wireless communication frequency band;
   upon detecting at least one access point communicating over the first wireless communication frequency band, receiving from the detected access point information identifying one or more channels of a second wireless communication frequency band, different from the first wireless communication frequency band; and
   defining the set of channels to include the identified channels of the second wireless communication frequency band.

3. The product of claim 2, wherein said instructions result in:
   skipping the scanning of other channels of the second wireless communication frequency band, which are not identified by the information received from the access point.

4. The product of claim 2, wherein said instructions result in:
   receiving a channel report information element from the access point, the channel report information element identifying a channel utilized by a control point of the wireless area network; and
   scanning the channel identified by the channel report information element to detect the control point.

5. The product of claim 2, wherein the information from the access point includes a country information-element identifying a regulatory domain in which the access-point is located, and wherein the method includes determining the set of channels based on the country information element.

6. The product of claim 1, wherein said instructions result in:
   increasing the scanning duration by doubling the scanning duration; and
   repeating the scanning using the doubled scanning duration until receiving the beacon frame or until the scanning duration reaches a predefined scanning duration limit.

7. The product of claim 1, wherein the wireless communication frequency band includes a 60 Gigahertz frequency band.

* * * * *